United States Patent
Erlendsson (10) Patent No.: US 9,110,189 B2
(45) Date of Patent: *Aug. 18, 2015

(54) TOWING WARP

(71) Applicant: Hjortur Erlendsson, Kopavogur (IS)

(72) Inventor: Hjortur Erlendsson, Kopavogur (IS)

(73) Assignee: Hampidjan hf, Reykjavik (IS)

( * ) Notice: Subject to any disclaimer, the term of this patent is extended or adjusted under 35 U.S.C. 154(b) by 0 days.

This patent is subject to a terminal disclaimer.

(21) Appl. No.: 14/252,747

(22) Filed: Apr. 14, 2014

(65) Prior Publication Data

US 2014/0216782 A1    Aug. 7, 2014

Related U.S. Application Data

(63) Continuation of application No. 12/736,891, filed on Nov. 19, 2010, now Pat. No. 8,731,353.

(51) Int. Cl.
*G02B 6/44* (2006.01)
*G01V 1/20* (2006.01)
*H01B 13/22* (2006.01)
*H01B 7/04* (2006.01)

(52) U.S. Cl.
CPC .............. *G01V 1/201* (2013.01); *H01B 7/045* (2013.01); *H01B 13/22* (2013.01); *Y10T 29/49117* (2015.01)

(58) Field of Classification Search
None
See application file for complete search history.

(56) References Cited

U.S. PATENT DOCUMENTS

| 6,014,487 | A  | * | 1/2000  | Field et al. ..................... 385/110 |
| 6,531,694 | B2 | * | 3/2003  | Tubel et al. ............... 250/227.14 |
| 7,848,604 | B2 | * | 12/2010 | Reed et al. ..................... 385/100 |
| 2004/0045735 | A1 | * | 3/2004  | Varkey et al. ............. 174/120 R |
| 2006/0045442 | A1 | * | 3/2006  | Varkey et al. ................. 385/102 |
| 2006/0198585 | A1 | * | 9/2006  | Keller et al. .................. 385/107 |

* cited by examiner

*Primary Examiner* — Tina Wong
(74) *Attorney, Agent, or Firm* — Donald E. Schreiber

(57) ABSTRACT

A production method for a headline sonar cable (20, 120) that exhibits a high breaking-strength and lighter weight than a conventional steel headline sonar cable. Producing the headline sonar cable (20, 120) is characterized by the steps of:
   a. providing an elongatable internally-located conductive structure (34, 134) that is adapted for data signal transmission; and
   b. braiding a strength-member jacket layer (52) of polymeric material around the structure (34, 134) while ensuring that the structure (34, 134) is slack when surrounded by the jacket layer (52).

The structure (34, 134) of the cable (20, 120) retains conductivity upon stretching of the jacket layer (52) surrounding the structure (34, 134) that lengthens the cable (20, 120). For one embodiment of the method a conductor (20) wrapped around a rod (24) and enclosed within a sheath layer (32) forms the structure (34, 134). For another embodiment of the method a braided conductor (122) enclosed within a braided sheath (124) and a polymeric layer (132) forms the structure (34, 134).

27 Claims, 5 Drawing Sheets

TOWING WARP

This application is a continuation of U.S. patent application Ser. No. 12/736,891 filed Nov. 19, 2012; that claimed priority under 35 U.S.C. §371 from Patent Cooperation Treaty ("PCT") international Patent Application PCT/US2009/003183 filed May 22, 2009 as that PCT patent application was amended by a Demand for International Preliminary Examination filed with the USPTO on Mar. 17, 2010.

TECHNICAL FIELD

The present disclosure relates generally to the technical field of cables and, more particularly, to a cable that is made from a synthetic polymeric material, that has cross-sectional symmetry, that exhibits high stiffness and breaking strength, and that includes data signal and/or energy conductors therein.

BACKGROUND ART

A towed trawl usually includes a headline sonar sensor for monitoring the trawl's headline height, the trawl's opening and fish schools in front of the trawl. A data transmission cable, i.e. a headline sonar cable that is sometimes called a third wire includes a conductor for transferring data signals from the headline sonar sensor to the towing vessel. Presently, strength members of conventional headline sonar cables are made from steel, and enclose a central copper conductor that is surrounded by layed, multi-layed and torsion balanced, or braided copper wires. The braided copper wires surrounding the central conductor shield the data signal carried on the central copper conductor from electromagnetic interference that degrades the quality of transmitted data signals. Headline sonar cables can be up to 4000 meters long and, besides their main function of transferring data signals, the cable is also sometimes used to increase trawl's opening by raising the headline. This is why a headline sonar cable is sometimes called a third wire.

When used with a trawl, a headline sonar cable must absorb the stress that results from the trawler's surging on sea swells. Surging causes the stern of the trawler where the third wire winch is located to impart surging shocks to the headline sonar cable being deployed therefrom. Surging significantly increases compressive force applied to the headline sonar cable at the winch thereby correspondingly increasing the likelihood that the headline sonar cable's data signal conductor may become damaged.

One disadvantage of a conventional steel headline sonar cable is its weight. The weight of a steel headline sonar cable adversely affects trawl operation and fishing gear's performance. A long steel headline sonar cable extending between a trawler and a trawl will, between the trawler the headline sonar, descend below the trawl's headline. Furthermore, a trawler's headline sonar cable winch frequently lacks sufficient power to tense the steel headline sonar cable since the winch is supporting the cable's weight.

A steel headline sonar cable that descends below the trawl's headline necessarily passes through schools of fish that are in front of the trawl's opening. Passage of the steel headline sonar cable through a school scares the fish and the school will turn sideways. A schools' sideways turn may reduce the catch because some of the fish avoid the trawl's opening.

Another disadvantage of a steel headline sonar cable occurs if the cable breaks. A broken steel headline sonar cable, due to its weight, initially falls downward and then starts cutting through and damaging the trawl. Similarly, when the trawler turns while towing a trawl it often becomes difficult to control a steel headline sonar cable to avoid contact between the cable and the trawl's warp lines and/or the bridles. Contact between the headline sonar cable and the trawl's warp lines and/or bridles can damage either or both the headline sonar cable and the trawl's warp lines and/or bridles. Similarly, sometimes a headline sonar cable contacts a trawl door. Contact between a headline sonar cable and a trawl's door can result either in the cable being cut, or the cable becoming entangled with the door so the trawl door become uncontrollable. Curing any of the preceding problems associated with the use of a steel headline sonar cable requires retrieving, repairing and/or readjusting the fishing gear.

Over time rust also degrades a steel headline sonar cable. Furthermore, steel headline sonar cables are difficult to splice because they typically consists of two twisted layers of steel wires, one layer twisted clockwise and the layer other counterclockwise.

Cables made from synthetic polymeric materials exhibit rather different physical properties compared to conductors, e.g. optical fibers and wires made from copper, aluminum or other metals. In general, the elasticity of conductors is very low while synthetic polymeric materials generally exhibit greater inherent elasticity. Twisting stranding and/or braiding fibers and/or filaments of synthetic polymeric materials into a cable further increases elasticity of the finished cable due to voids that occur between fibers and/or filaments. A straight conductor oriented parallel to or inside a cable made from synthetic polymeric materials tends to break upon an initial application of tension which stretches the cable. The constructional elasticity of cables made from synthetic polymeric materials can be reduced by stretching the cable either while it is hot or cold. Stretching a cable made from synthetic polymeric materials reduces elasticity by compressing the fibers and/or filaments while also removing voids.

Fibers and/or filaments made from ultra high strength synthetic polymeric materials like Ultra High Molecular Weight Polyethylene ("UHMWPE"), e.g. Dyneema® and Spectra®; para-aramid, e.g. Kevlar® and Twaron®; carbon fibers; aromatic polyester, e.g. Vectran®; thermoset polyurethane. e.g. Zylon®; and aromatic copolyamid, e.g. Technora®; typically have elongation to break from 2-10%. A cable made from such materials generally exhibit 2-5% constructional elongation. If a conductor is placed inside or with a cable made from such a synthetic polymeric material it must be able to accept this elongation without either breaking or becoming brittle which ultimately results in premature conductor failure.

Tension bearing energy and data signal cables using synthetic fibers for a strength member are known. For example Cortland Cable Company offers such cables for seismic/magnetometer tow cables, sidescan sonar and video tow cables and seismic ocean bottom cables. Such cables when used for tethering a remotely operated vehicle ("ROV") operate at low tension and insignificant surge. Strong surge shocks are unusual for current applications of ROV tether lines and moored ocean cables or the other uses for known non-steel tension bearing energy and data signal cables. In fact, it is well known in the field that ROV's are not to be deployed with such tether cables in surge conditions in which trawler's usually routinely and actually operate. Consequently, none in the art have proposed a non-steel tension bearing data signal and energy cable capable of tolerating very high loads such as those applied to a trawl's headline sonar cable while also capable of being wound on a drum or winch under high tensions. Until the present disclosure, none in the art have proposed a non-steel bearing energy and data signal cables that can be wound and deployed from a winch subject to a fishing trawler's surging shocks while not impairing the cable in a short time, especially in less than 6 calendar months from a date of first use.

In fact, it is accurate to state that when high tension is required in combination with repeated windings under tension onto a winch's drum and storage under tension on that drum such as occurs with a trawl's headline sonar cable, it is contrary to the trend of the industry to form a tension bearing data signal cable having a conductor enclosed by a strength member formed of synthetic fibers. Past experiments at sheathing conductors (including fibre optic lines, copper wires, etc.) within strength members such as braided jacket layers formed of synthetic polymeric fibers have failed in high tension applications such as those described above. Moreover, attempts to pre-stretch a strength member formed from synthetic polymeric fibers en-sheathing a conductor without breaking or otherwise causing failure of the conductor have also failed.

Published Patent Cooperation Treaty ("PCT") International Publication No. WO 2004/020732 A2, International Application No. PCT/IS2003/000025, discloses a cable having a thermoplastic core enclosed within a braided, coextruded or pultruded jacket. During fabrication the cable is heated to a temperature at which the thermoplastic core becomes liquid or semiliquid. While heated to this temperature, the cable is stretched so it becomes permanently elongated. During stretching, material of the heated thermoplastic core fill voids within the surrounding jacket. For added strength and/or stiffness, the thermoplastic core may include a central, inner strength member fiber or filament that differs from that of the thermoplastic core and is made from a metal or polymeric material. Using the metal central inner strength member to carry data signals doesn't work because during cable fabrication either the metallic wire either breaks or becomes so brittle as to fail prematurely.

DISCLOSURE

An object of the present disclosure is to provide a non-steel headline sonar cable capable of being wound on a winch under tensions and surging shocks experienced by a fishing trawler that remains unimpaired throughout a commercially practical interval of at least 6 calendar months from a date of first use.

Another object of the present disclosure is to provide a non-steel headline sonar cable capable of being wound on a winch and remaining unimpaired under tensions and surging shocks experienced by fishing trawlers particularly those having displacements from 20 tonnes up to and exceeding 300 tonnes and even exceeding 3000 tonnes, as the trawler's displacement magnifies surge shocks.

Another object of the present disclosure is to provide a non-steel headline sonar cable capable of being wound on a winch at a tension exceeding 100 Kg that remains unimpaired throughout a commercially practical interval of at least 6 calendar months from a date of first use on trawlers exceeding tonnes displacement, since the trawler's displacement magnifies the surge shocks.

Another object of the present invention is to provide a non-steel headline sonar cable that does not kink when relaxed.

Disclosed is a method for producing a headline sonar cable having a high breaking-strength and lighter weight than a conventional headline sonar cable having a strength member formed of steel wire. Most broadly, the method for producing the headline sonar cable is characterized by the steps of;
  a. providing an elongatable internally-located conductive structure that is adapted for data signal transmission; and
  b. braiding a strength-member jacket layer of polymeric material to enclose the elongatable internally-located conductive structure while ensuring that the elongatable internally-located conductive structure is slack when surrounded by the strength-member jacket layer.

Produced in this way, the elongatable internally-located conductive structure does not break upon stretching of the strength-member jacket layer surrounding the elongatable internally-located conductive structure that lengthens the headline sonar cable.

In one embodiment of the preceding method the elongatable internally-located conductive structure is formed by wrapping a conductor that is capable of data signal transmission around a rod that deforms during subsequent stretching of the strength-member jacket layer. In another embodiment of the preceding method the elongatable internally-located conductive structure is formed by enclosing an unstretched braided conductor that is capable of data signal transmission within a non-conductive braided sheath.

For a metallic conductor or braided conductor, either of the preceding alternative embodiments includes further steps of:
  1. after braiding the strength-member jacket layer around the elongatable internally-located conductive structure
     a. heating the headline sonar cable; and
     b. stretching of the strength-member jacket layer sufficiently to elongate the headline sonar cable to reduce a reduction in the cross-sectional area of the strength-member jacket layer; and
  2. while maintaining tension on the strength-member jacket layer, cooling the headline sonar cable.

Also disclosed is a non-steel headline sonar cable fabricated in accordance with the disclosed method. An advantage of the disclosed non-steel headline sonar cable is that it is lite having a lower density than a steel headline sonar cable. Because the disclosed non-steel headline sonar cable is lighter than, and correspondingly more buoyant in water than, a conventional steel headline sonar cable, the disclosed cable:
  1. is easier to handle and keep out of the trawl's path; and
  2. reduces the power required for trawler equipment that handles the cable.

Due to the disclosed headline sonar cable's lite weight and buoyancy, its path from a trawler's winch down to the trawl's headline is more direct. Furthermore, due both to the disclosed headline sonar cable's lite weight and to the trawl's towing speed, the disclosed headline sonar cable tends to remain above the trawl's headline rather than descending below the headline. If a headline sonar cable remains above the trawl's headline, it cannot contact the trawl's warp lines, bridles and/or doors. Furthermore, if such a headline sonar cable breaks it will float over the trawl thereby avoiding damage to the trawl.

Another advantage of the disclosed non-steel headline sonar cable is that it can be spliced more easily and more quickly than a conventional steel headline sonar cable.

Yet another advantage of the disclosed non-steel headline sonar cable is that it corrodes less than a conventional steel headline sonar cable. Consequently, the disclosed non-steel headline sonar cable will last longer than a conventional steel headline sonar cable.

Yet another advantage of the disclosed non-steel headline sonar cable is that it exhibits less heat fatigue than a conventional steel headline sonar cable.

Possessing the preceding advantages, the disclosed non-steel headline sonar cable answers needs long felt in the industry.

These and other features, objects and advantages will be understood or apparent to those of ordinary skill in the art from the following detailed description of the preferred embodiment as illustrated in the various drawing figures.

BEST MODE FOR CARRYING OUT THE DISCLOSURE

Figure 1:
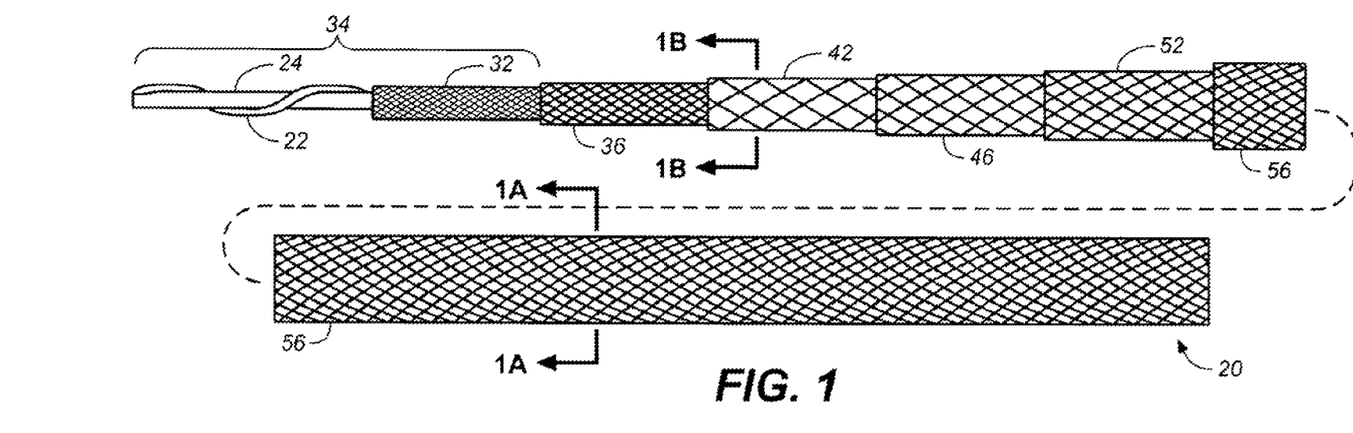
FIG. 1 is a plan view of a headline sonar cable in accordance with the present disclosure that reveals various layers included in one embodiment thereof.
Figure 1A:
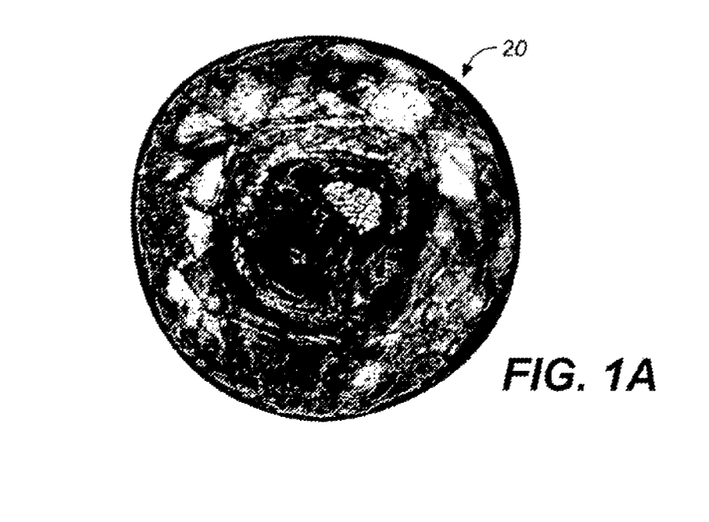
FIG. 1A is a photograph of a cross-section of the headline sonar cable depicted in FIG. 1 taken along the line 1A-1A in FIG. 1.

FIG. 1 illustrates a headline sonar cable in accordance with the present disclosure that is identified by the general reference character 20. FIG. 1 depicts a preferably insulated electrical conductor 22 wrapped around a rod 24 of deformable material and enclosed within a sequence of layers included in the particular embodiment of the headline sonar cable 20 illustrated in FIG. 1. The steps of a first fabrication method described below assemble the headline sonar cable 20 depicted in FIG. 1.

The First Fabrication Method

Step (1)

Figure 2:
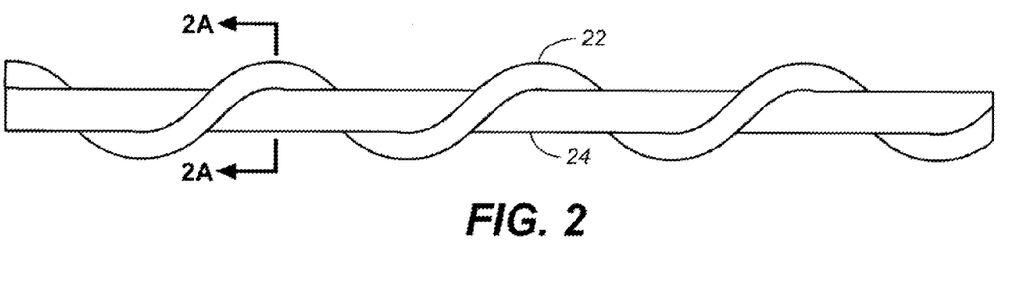
FIG. 2 is a plan view illustrating a conductor that is capable of data transmission wrapped around a rod that deforms during subsequent tensioning of an enclosing strength-member jacket layer all of which are included in the headline sonar cable depicted in FIG. 1.
Figure 2A:
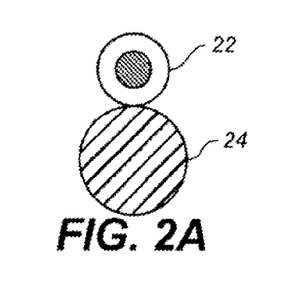
FIG. 2A is a cross-sectional view of the deformable rod with the data transmission conductor wrapped therearound taken along the line 2A-2A in FIG. 2.

Fabrication of the headline sonar cable 20 depicted in FIG. 1 begins with twisting and/or wrapping the preferably insulated electrical conductor 22 around the rod 24 of deformable material as depicted in greater detail in FIGS. 2 and 2A. The deformable material of the rod 24 can be a thermoplastic material, a plastic material, or any other material that deforms when exposed to pressures generated while stretching various layers of the headline sonar cable 20 depicted in FIG. 1 in the manner described in greater detail below.

An essential characteristic of the present disclosure is that all subsequent processing steps including a step of stretching various layers of the headline sonar cable 20 depicted In FIG. 1 preserves the integrity of the conductor 22. Regarding the conductor 22, any insulation thereon:

1. has a higher softening temperature than that of the preferably thermoplastic rod 24; while
2. being deformable during stretching various layers of the headline sonar cable 20 in the manner described in greater detail below.

There exist numerous conventional insulating materials that satisfy the preceding criteria for an insulator included in the headline sonar cable 20.

Twisting the conductor 22 around the rod 24 in a direction corresponding to a lay direction of the conductor 22 is advantageous. The shape of the conductor 22 when twisted and/or wrapped around the rod 24 is that of a spiral, although in accordance with the present disclosure the headline sonar cable 20 may be twisted and/or wrapped around the rod 24 in shapes other than that of a spiral or helix which alternative shapes also function as well in the headline sonar cable 20 as the spiral shape. In fact, any suitably arranged configuration for the headline sonar cable 20 in which it meanders along the length of the rod 24 should be capable of providing sufficient slack in the headline sonar cable 20 that it does not break while stretching various layers of the headline sonar cable 20 depicted in FIG. 1 in the manner described in greater detail below.

The conductive material of the headline sonar cable 20 includes fibers and/or filaments for carrying information. In accordance with the present disclosure such information carrying fibers and/or filaments include optical fibers and electrically conductive wire. Usually, the headline sonar cable 20 includes filaments capable of carrying electrical energy and/or current, such as copper strands or wires. For purposes of this disclosure, the terms fiber and filament are used interchangeably.

Step (2)

Figure 3:
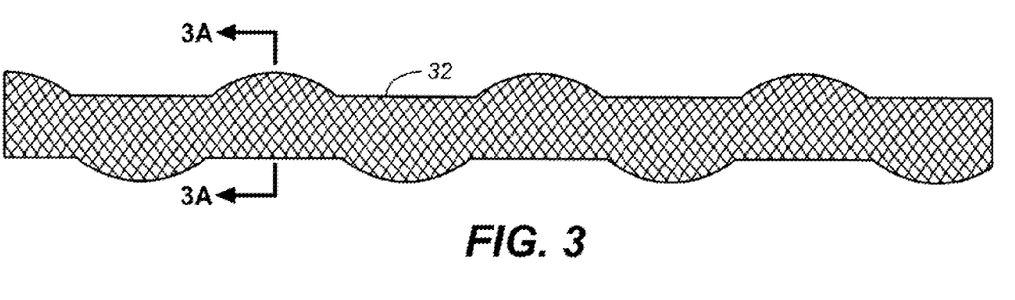
FIG. 3 is a plan view illustrating the conductor and rod of the headline sonar cable depicted in FIG. 2 after being enclosed within an sheath layer of material that has a higher softening temperature than that of the rod.
Figure 3A:
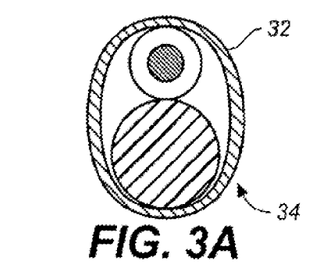
FIG. 3A is a cross-sectional view of the conductor and rod of FIG. 2 enclosed within the sheath layer that is taken along the line 3A-3A in FIG. 3.

Referring now to FIGS. 3 and 3A, the next step in forming the headline sonar cable 20 is enclosing (including forming a sheath over) the conductor 22 and rod 24 within a sheath layer 32 of material that has a higher softening temperature than that of the rod 24. If tightly braided, wrapped or extruded material of the sheath layer 32 has a higher softening temperature than the material of the rod 24, the material of the rod 24 will not extrude through the sheath layer 32 during prestretching and/or heatsetting most of the cable layers depicted in FIG. 1 in the manner described in greater detail below. The sheath layer 32 may be formed by tightly braiding or wrapping the conductor 22 and the rod 24 with a material, e.g. polyester fibers, having higher softening temperature than that of the rod 24. Alternatively, the sheath layer 32 may be extruded around the conductor 22 and the rod 24. The conductor 22 and the rod 24 enclosed within the sheath layer 32 form an elongatable internally-located conductive structure 34 of the headline sonar cable 20.

Step (3)

Figure 4:
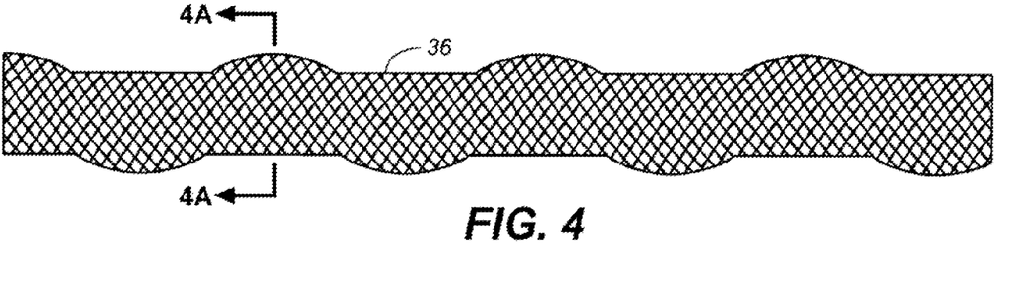
FIG. 4 is a plan view illustrating the conductor, the rod and the sheath layer of the headline sonar cable depicted in FIG. 3 after being enclosed within an shielding layer of electrically conductive material.
Figure 4A:
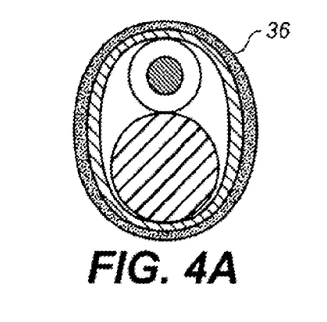
FIG. 4A is a cross-sectional view of the conductor, the rod and the sheath layer of FIG. 3 enclosed within the shielding layer that is taken along the line 4A-4A in FIG. 4.

Referring now to FIGS. 4 and 4A, when the conductor 22 is an electrical conductor the next step in forming the headline sonar cable 20 is overbraiding or overtwisting the conductor 22, rod 24 and sheath layer 32 of FIG. 3 with a shielding layer 36 of electrically conductive material, e.g. copper wires, to shield the conductor 22 from electromagnet interference. The shielding layer 36 must remain unimpaired when elongating up to fourteen percent (14%) while stretching various layers of the headline sonar cable 20 depicted in FIG. 1 in the manner described in greater detail below.

Step (4)

Figure 5:
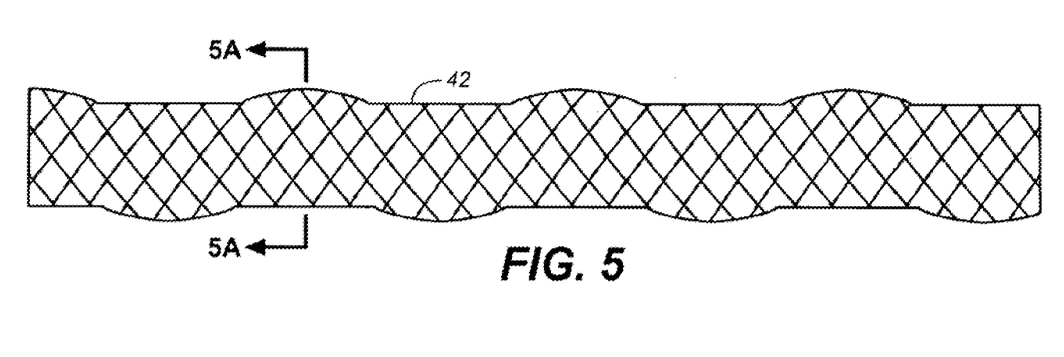
FIG. 5 is a plan view illustrating the conductor, the rod, the sheath layer and the shielding layer of the headline sonar cable depicted in FIG. 4 after being enclosed within an optional water-barrier layer of material.
Figure 5A:
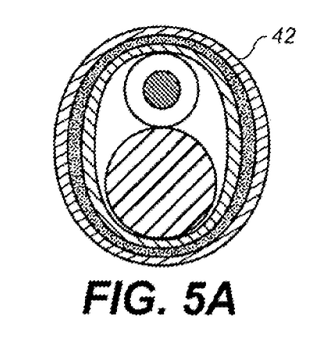
FIG. 5A is a cross-sectional view of the conductor, the rod, the sheath layer and the shielding layer of FIG. 4 enclosed within the water-barrier layer that is taken along the line 5A-5A in FIG. 5.

Referring now to FIGS. 5 and 5A, the next step in forming the headline sonar cable 20 is to pultrude or extrude, cover or otherwise enclose (including forming a sheath over) the conductor 22, rod 24, sheath layer 32 and shielding layer 36 with a water-barrier layer 42 to serve as a water shield. The water-barrier layer 42 is formed as thin as possible from a plastic, metallic or other material to bar the enclosed layers from water intrusion (i.e. formed and/or constructed so as to be impermeable to water). Preferably polyethylene forms the water-barrier layer 42.

Step (5)

Figure 6:
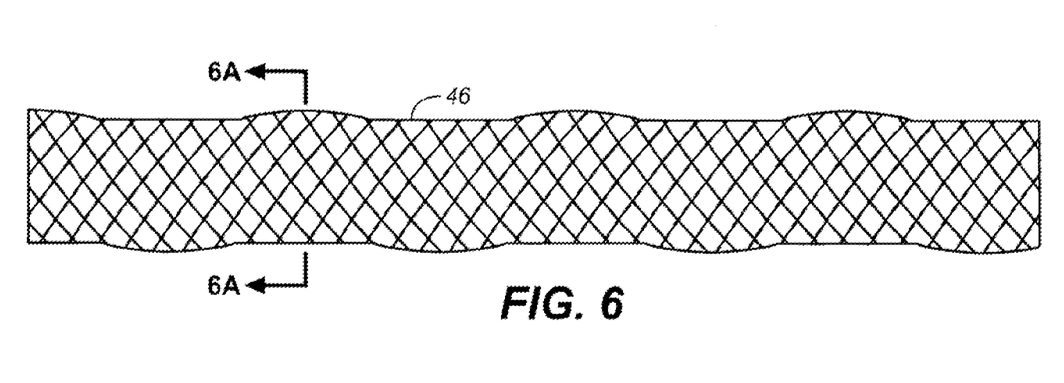
FIG. 6 is a plan view illustrating the conductor, the rod, the sheath layer, the shielding layer and the water-barrier layer of the headline sonar cable depicted in FIG. 5 after being enclosed within an extrusion-barrier layer of material.
Figure 6A:
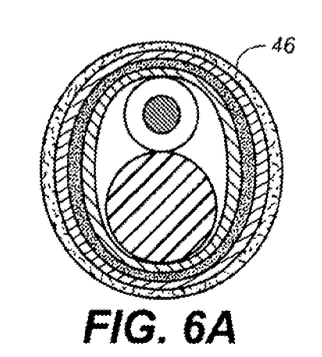
FIG. 6A is a cross-sectional view of the conductor, the rod, the sheath layer, the shielding layer and the water-barrier layer of FIG. 5 enclosed within the extrusion-barrier layer that is taken along the line 6A-6A in FIG. 6.

Referring now to FIGS. 6 and 6A, the next step in forming the headline sonar cable 20 is to overbraid or cover the conductor 22, rod 24, sheath layer 32, shielding layer 36 and water-barrier layer 42 with a tightly braided or wrapped extrusion-barrier layer 46 of a material having a higher softening temperature than the material of the water-barrier layer 42. If tightly braided, wrapped or extruded material of the extrusion-barrier layer 46 has a higher softening temperature than the material of the water-barrier layer 42, the material of the water-barrier layer 42 will not extrude through the extrusion-barrier layer 46 during prestretching and/or heatsetting most of the cable layers depicted in FIG. 1 in the manner described in greater detail below. For example, the extrusion-barrier layer 46 may be formed from braided polyester fibers (including plaits, strands and filaments and other). Alternatively, instead of braided polyester fibers the extrusion-barrier layer 46 may be formed from aluminum tape that is wrapped about the conductor 22, rod 24, sheath layer 32, shielding layer 36 and water-barrier layer 42 with approximately a 50% overlapping of each subsequent wrap of the aluminum tape. Forming the extrusion-barrier layer 46 from a wrapped aluminum tape is particularly advantageous as it reduces the diameter of the headline sonar cable 20 in comparison to forming the extrusion-barrier layer 46 from braided or wrapped polyester fibers.

Due to the importance of minimizing the diameter of the headline sonar cable 20, it is important that the rod 24 has the smallest diameter practicable. In particular, the diameter of the rod 24 can be determined experimentally so that after stretching various layers of the headline sonar cable 20 depicted in FIG. 1 in the manner described in greater detail below the conductor 22 is either completely straightened out or so near to being completely straight that any deviation from being entirely parallel to the longitudinal axis of the sheath layer 32 allows only slight additional elongation of the conductor 22. As used herein slight additional elongation of the conductor 22 means less than 10% elongation, and preferably less than 7% elongation, and even less than 2% elongation, and even less than 14 elongation of the conductor 22 prior to its becoming straight as contrasted with breaking or failing of the conductor 22. Dissecting headline sonar cables 20 fabricated in accordance with this disclosure using different diameter rods 24 to extract the conductor 22 therefrom and then stretching the conductor 22 until it becomes straight permits experimentally determining a preferred diameter for the rod 24.

Step (6)

Figure 7:
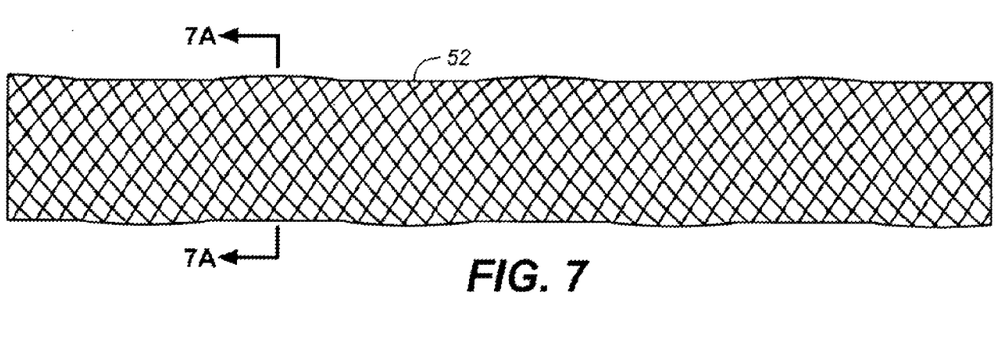
FIG. 7 is a plan view illustrating the conductor, the rod, the sheath layer, the shielding layer, the water-barrier layer and the extrusion-barrier layer of the headline sonar cable depicted in FIG. 6 after being enclosed within the strength-member jacket layer of polymeric material.
Figure 7A:
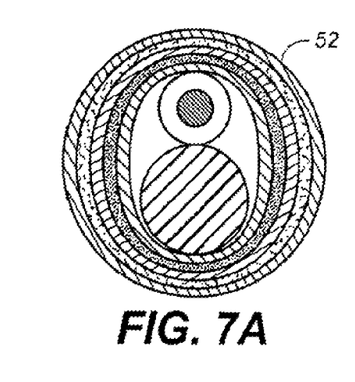
FIG. 7A is a cross-sectional view of the conductor, the rod, the sheath layer, the shielding layer, the water-barrier layer and the extrusion-barrier layer of FIG. 6 enclosed within the strength-member jacket layer that is taken along the line 7A-7A in FIG. 7.

Whatever combination of layers are included in the headline sonar cable 20 in addition to the conductor 22, the rod 24 and the extrusion-barrier layer 46, referring now to FIGS. 7 and 7A, the next step in forming the headline sonar cable 20 is to overbraided over all those layers a layer of polymeric fiber such as UHMWPE, Aramids (Kevlar), carbon fibers, LCP (Vectran), PBO (Zylon), Twaron and Technora, etc. to form the strength-member jacket layer 52 of the headline sonar cable 20.

Step (7)

The conductor 22, the rod 24 and the extrusion-barrier layer 46 together with any other layers enclosed within the strength-member jacket layer 52 and the strength-member jacket layer 52 itself are then heat-stretch and/or heat-set, preferably in such a way as to cause the rod 24 to become malleable (semi-soft) so it can be permanently deformed, and otherwise in such a way as described for subsequent processing steps 9, 10 and 11, which repeat heat-stretching.

Step (8)

Figure 8:
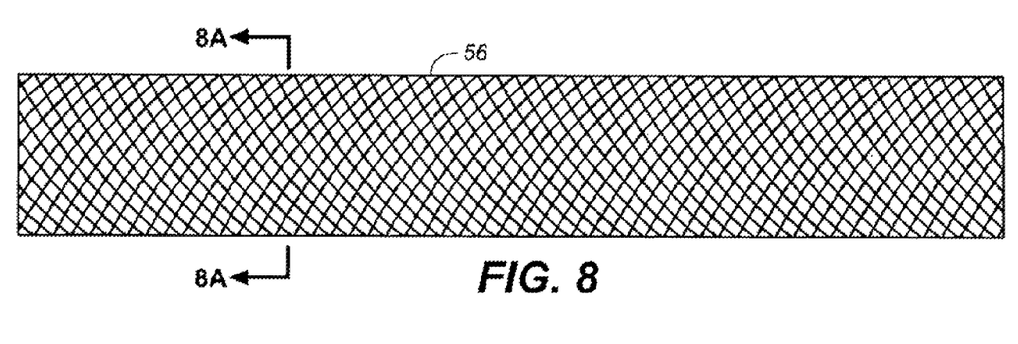
FIG. 8 is a plan view illustrating the conductor, the rod, the sheath layer, the shielding layer, the water-barrier layer, the extrusion-barrier layer and the strength-member jacket layer of the headline sonar cable depicted in FIG. 7 after being enclosed within a protective layer of material.
Figure 8A:
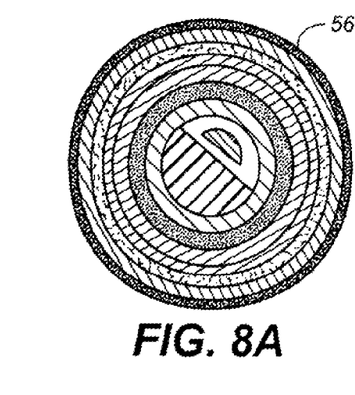
FIG. 8A is a cross-sectional view of the conductor, the rod, the sheath layer, the shielding layer, the water-barrier layer, the extrusion-barrier layer and the strength-member jacket layer of FIG. 7 enclosed within the protective layer that is taken along the line 8A-8A in FIG. 8.

Referring now to FIGS. 8 and 8A, the next step in forming the headline sonar cable 20 is to overbraid or cover the strength-member jacket layer 52 and everything enclosed within the strength-member jacket layer 52 with a final protective layer 56 of the headline sonar cable 20. The protective layer 56 shields the strength member from damage caused by abrasion or cutting. One characteristic of the protective layer 56 is that it must be capable of tolerating further elongation of the headline sonar cable 20 as described in subsequent processing steps.

Step (9)

The next fabrication step in making the headline sonar cable 20 is heating the headline sonar cable 20 again to a temperature that causes the rod 24 to become malleable (semi-soft) so the rod 24 again becomes deformable but not so hot that material forming the rod 24 flows. While maintaining the headline sonar cable 20 in this heated state, fabrication of the headline sonar cable 20 concludes with performing the operations described in Steps (10) and (11) below.

Step (10)

The next to last fabrication step is stretching the headline sonar cable 20 applying sufficient tension to at least the strength-member jacket layer 52 so as to elongate the strength-member jacket layer 52 a desired amount. The desired amount of elongation of the strength-member jacket layer 52 is usually an amount that after the headline sonar cable 20 cools the strength-member jacket layer 52 is unable to stretch more than approximately three and one-half percent (3.5%) until breaking, and especially so as to permit permanent elongation of the cooled jacket layer.

A preferred temperature when stretching the protective layer 56 of the headline sonar cable 20 that is formed of UHMWPE is 117 degrees centigrade (117° C.). A temperature between 114 degrees centigrade (114° C.) to 117 degrees centigrade (117° C.) is highly useful when stretching the protective layer 56 of the headline sonar cable 20 that is formed of UHMWPE. A temperature between 110 degrees centigrade (110° C.) to 120 degrees centigrade (120° C.) is useful when stretching the protective layer 56 of the headline sonar cable 20 that is formed of UHMWPE, with a temperature range 100 degrees centigrade (100° C.) to 124 degrees centigrade (124° C.) also being useful. Depending upon the tension applied to the headline sonar cable 20, and also depending upon the types of fibers and/or filaments used in making the headline sonar cable 20, temperatures from 90 degrees centigrade (90° C.) to 150 degrees centigrade (100° C.) are useful.

In general, applying more tension to the headline sonar cable 20 reduces the temperature to which the headline sonar cable 20 must be heated, and conversely. The temperature selected and applied and the tension selected and applied are such as to maximize the strength of the jacket layer in the headline sonar cable 20 while also minimizing, and preferably eliminating, its ability to further elongate;

Step (11)

The final fabrication step is cooling the headline sonar cable 20 while maintaining tension on at least the strength-member jacket layer 52 so that layer together with the other layers cool while under tension. In this way:

1. all layers of the headline sonar cable 20 become permanently elongated while also becoming permanently formed into a position wherein the conductor 22 becomes intertwined with the rod 24; and
2. the other deformable components of the headline sonar cable 20, which includes many if not all layers of the headline sonar cable 20, take up a shape that supports the internal shape of the tense strength-member jacket layer 52.

For example, as a result of this last step, the conductor 22 becomes compressed against the malleable rod 24, and as a result displaces some of the rod 24 and actually comes to occupy some of the space formerly occupied only by the rod 24. Due to elongation of the headline sonar cable 20, the diameter in which the conductor 22 is initially wrapped around the rod 24 shrinks with the rod 24 and the conductor 22 becoming intertwined. Depending upon how much tension is applied to the headline sonar cable 20 during fabrication, the combined conductor 22 and rod 24 can become an essentially cylindrical-like structure with spaces often barely discernable between the conductor 22 and the rod 24.

Due to the heating and stretching described above all layers of the headline sonar cable 20 enclosed within the strength-member jacket layer 52 and the protective layer 56 assume a shape that supports and conforms to the internal wall of the immediately surrounding layer. Accordingly, during heating and stretching of the headline sonar cable 20 the extrusion-barrier layer 46 directly contacting the strength-member jacket layer 52 takes a shape that supports and conforms precisely to the internal shape of the strength-member jacket layer 52. Layers of the finished headline sonar cable enclosed within the extrusion-barrier layer 46 assume a shape similar to that of the extrusion-barrier layer 46 with the degree of similarity decreasing progressively toward the center of the headline sonar cable 20. At the center of the finished headline sonar cable 20 illustrated in FIGS. 1-8, 1A, 1B and 2A-8A, the shape of the combined conductor 22 and rod 24 may be almost cylindrical with deformed exterior surface.

Preferred Fabrication Method

Figure 9:
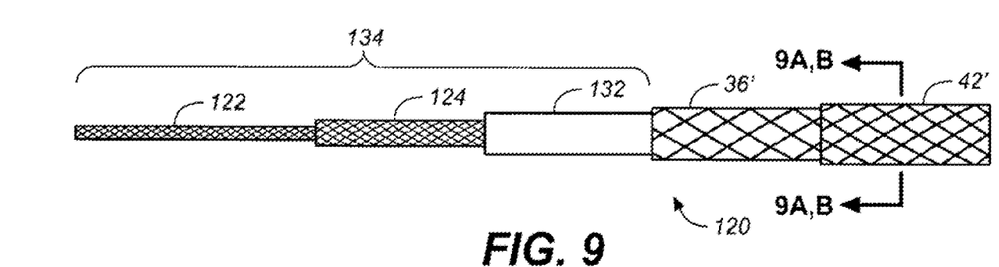
FIG. 9 is a plan view of a portion of an alternative embodiment for an elongatable centrally-located conductive structure included in a most preferred alternative embodiment of the headline sonar cable depicted in FIGS. 1, 1A, 1B, 2-8 and 2A-8A.
Figure 9A:
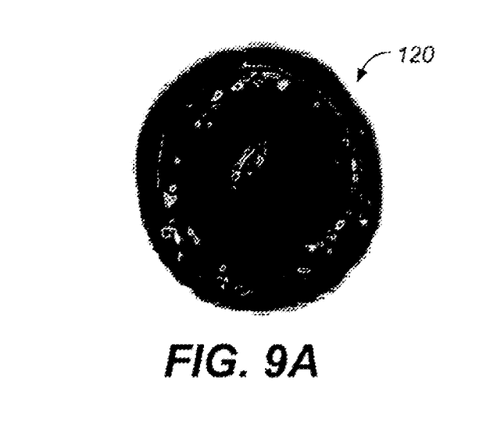
FIG. 9A is a photograph of a cross-section of the alternative embodiment headline sonar cable depicted in FIG. 9 taken along the line 9A,B-9A,B in FIG. 9.
Figure 9B:
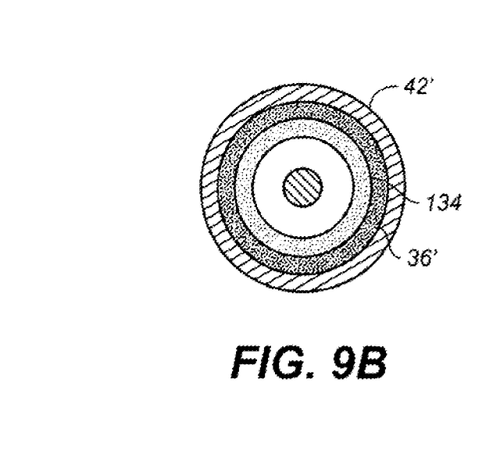
FIG. 9B is a cross-sectional view that depicts those layers of the alternative embodiment headline sonar cable which appear at the line 9A,B-9A,B in FIG. 9 as those layers appear in the finished headline sonar cable.

FIGS. 9, 9A and 9B depict a most preferred, alternative embodiment headline sonar cable in accordance with the present disclosure that is identified by the general reference character 120. Those elements depicted in FIGS. 9, 9A and 9*b* that are common to the headline sonar cable 20 illustrated in FIGS. 1-8, 1A, 1B and 2A-8A carry the same reference numeral distinguished by a prime ("'") designation. The most preferred embodiment of the headline sonar cable 120 depicted in FIGS. 9, 9A and 9B eliminates the elongatable internally-located conductive structure 34 depicted in FIGS. 3 and 3A formed my the conductor 22, rod 24 and sheath layer 32. Instead of the conductor 22, the headline sonar cable 120 includes an initially unstretched braided conductor 122 that first has a non-conductive braided sheath 124 overbraided around the braided conductor 122. Preferably, the braided sheath 124 formed of a polymeric material fibers such as polyester fibers. Then, if the braided conductor 122 is made from an electrically conductive material pultruding or extruding a polymeric layer 132 around the braided conductor 122 enclosed within the braided sheath 124. The polymeric layer 132 is preferably formed from cellular polyethylene and has a radial thickness that establishes a proper electrical impedance for the headline sonar cable 120. The use of cellular polyethylene for electrical insulation is further described at least in U.S. Pat. Nos. 4,173,690, 5,346,926 and 7,507,909 B2 that are hereby incorporated by reference. Alternatively, a polyurethane material may also be used provided that it does not tend to contract the headline sonar cable 20 longitudinally after stretching various layers of the headline sonar cable 20 depicted in FIG. 1 in the manner described in greater detail below.

Configured as described above, the braided conductor 122, the braided sheath 124 and the polymeric layer 132 form a most preferred embodiment of an elongatable internally-located conductive structure 134 of the headline sonar cable 20. After the elongatable internally-located conductive structure 134 has been assembled, fabrication of the most preferred, alternative embodiment headline sonar cable 120 then continues with further processing the elongatable internally-located conductive structure 134 as described previously for Steps (3) through (11) above.

INDUSTRIAL APPLICABILITY

Figure 1B:
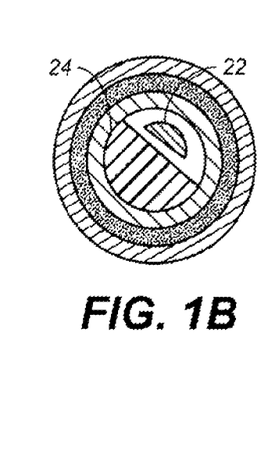
FIG. 1B is a cross-sectional view that depicts those layers of the headline sonar cable which appear at the line 1B-1B in FIG. 1 as those layers appear in the finished headline sonar cable.

A headline sonar cable 120 of the type depicted in FIGS. 9, 9A and 9B having the single braided conductor 122 or the headline sonar cable 20 of the type depicted in FIGS. 1B and 2A having the single conductor 22 is useful for a trawl headline sonar cable. When the headline sonar cable 20 is fabricated for certain applications, such as headline cables used for towed seismic surveillance arrays, the headline sonar cable 20 may include several individual information carrying fibers and/or filaments rather than a single fiber and/or filament as depicted in the illustration of FIGS. 1B and 2A. For the purposes of this disclosure, as many distinct conductive fibers and/or filaments as required to carry both data signals and electrical energy for any particular application are understood to be included in the headline sonar cable 20, whether there be one or hundreds or even more distinct information carrying fibers and/or filaments. As is readily apparent to those skilled in the art, for a headline sonar cable 20 having two (2) or more distinct information carrying electrically conductive fibers and/or filaments each of those fibers and/or filaments must be electrically insulated from all of the other distinct information carrying fibers and/or filaments.

If instead of an electrically conductive material the headline sonar cable 20 or 120 uses optical fibers for the conductor 22 or the braided conductor 122 to carry the data signals, the headline sonar cable 20 or 120 no longer requires the shielding layer 36 or 36'. If the headline sonar cable 20 or 120 omits the shielding layer 36 or 36' because optical fibers form the conductor 22 or the braided conductor 122, then the headline sonar cable 20 or 120 may also omit the sheath layer 32 or the polymeric layer 132.

Because the headline sonar cable 20 or 120 is made mainly from synthetic polymeric materials, it has much lower density that a conventional steel headline sonar cable. In fact the density of the headline sonar cable 20 or 120 is approximately the same as that of water. If a particular application such as deep water trawling benefits from a more dense headline sonar cable 20 or 120, then fibers or filaments made from a denser material, e.g. a dense metal, may replace some or all of the fibers or filaments of the protective layer 56 or 56'. Furthermore, varying the thickness of the protective layer 56 or 56' permits adjusting the buoyancy of the headline sonar cable 20 or 120 to a particularly desired value. Using a denser and harder material such as steel for some or all of the fibers or filaments of the protective layer 56 or 56' also significantly enhances the abrasion resistance of the headline sonar cable 20 or 120.

In addition to being used with trawls, headline sonar cables in accordance with the present disclosure may be used as synthetic towing warps on trawlers or other vessels, are also used as a lead-in cable for towed seismic surveillance arrays. Towing seismic surveillance arrays requires that the lead-in cable transmit both electrical energy and data signals a long distance between the towing vessel and the array with a minimum of drag, a minimum of weight, and a minimum of lead-in cable movement.

Furthermore, a significant use for headline sonar cables is stationary seismic surveillance such as anchored and/or moored cables for transmitting both data and electrical energy, and requiring a certain strength. Stationary seismic cables transfer data signals often up to a surface buoy, and are positioned on and/or relative to the seabed for long periods of time, even several years. Ocean currents tend to move such anchored seismic cables. Because it is important to limit movement of an anchored seismic cable as much as practicable, it is advantageous to reduce as much as possible the affect of ocean currents on an anchored seismic cable's location. A thinner anchored seismic cable tends to be moved less by ocean currents. Although the present invention has been described in terms of the presently preferred embodiment, it is to be understood that such disclosure is purely illustrative and is not to be interpreted as limiting. Consequently, without departing from the spirit and scope of the disclosure, various alterations, modifications, and/or alternative applications of the disclosure will, no doubt, be suggested to those skilled in the art after having read the preceding disclosure. Accordingly, it is intended that the following claims be interpreted as encompassing all alterations, modifications, or alternative applications as fall within the true spirit and scope of the disclosure.

What is claimed is:

1. A method for producing a towing warp (20, 120) having a high breaking-strength and lighter weight in water than a conventional towing warp having a strength member formed exclusively of steel wire, the method for producing the towing warp (20, 120) comprising steps of:
   a. providing a conductor (22, 122) that is formed so as to be capable of undergoing permanent elongation and that also is adapted for at least electrical energy and/or current transmission;
   b. forming a strength-member jacket layer (52) of polymeric material around at least a portion of the conductor (22, 122) while simultaneously ensuring that the at least a portion of the conductor (22, 122) remains elongatable when enclosed within the strength-member jacket layer (52); and
   c. stretching the strength-member jacket layer (52) so as to permanently elongate both the strength member jacket layer (52) and the at least a portion of the conductor (22, 122) while simultaneously not breaking the at least a portion of the conductor.

2. The method of claim 1 further comprising an additional step of enclosing the at least a portion of the conductor within at least a layer of a deformable material, the layer of deformable material situated between the conductor and at least portions of the strength member.

3. The method of claim 2 further comprising an additional step of selecting for the deformable material a thermoplastic material.

4. The method of claim 2 further comprising an additional step of selecting for the deformable material a material capable of tolerating temperatures that at least include temperatures between 100 degrees Centigrade and 124 degrees Centigrade.

5. The method of claim 2 further comprising additional steps of selecting for the deformable material a material capable of tolerating temperatures that at least include a temperature range that is between 100 degrees Centigrade and 124 degrees Centigrade and that also experiences a phase change at such temperature range.

6. The method of any one of claims 1 to 3 further comprising additional steps of forming the conductor is such a fashion, and selecting an amount of permanent elongation to stretch both the strength-member jacket layer as well as the at least a portion of the conductor in such a fashion that the at least a portion of the conductor is able to not break for at least six calendar months from a date of first use of the produced towing warp.

7. The method of any one of claims 1 to 3 further comprising additional steps of heating the strength-member jacket layer (52) to a temperature that enables permanently elongating the strength-member jacket layer (52) while stretching the strength-member jacket layer (52).

8. The method of claim 7 further comprising additional steps of cooling at least the strength-member jacket layer (52) while maintaining tension on the strength-member jacket layer (52).

9. The method of claim 1 wherein the step of providing the elongatable conductor (22) further comprises the additional steps of assembling an elongatable internally-located conductive structure (34) provided for the towing warp (20) by wrapping the conductor (22) around a rod (24) that permanently deforms during the subsequent stretching of the strength-member jacket layer (52) surrounding the elongatable internally-located conductive structure (34) thereby lengthening the elongatable internally located conductive structure while not breaking the conductor (22).

10. The method of claim 9 wherein the step of providing the elongatable internally-located conductive structure (34) further comprises the step of enclosing the conductor (22) and the rod (24) within a sheath layer (32) of material that has a higher softening temperature than that of the rod (24).

11. The method of claim 9 wherein twisting the conductor (22) excessively in a direction corresponding to a lay direction of the conductor (22) ensures slack in the conductor (22).

12. The method of claim 9 wherein forming the conductor (22) with a spiral shape ensures slack in the conductor (22).

13. The method of claim 9 comprising further steps of:
c. before braiding the strength-member jacket layer (52) around the elongatable internally-located conductive structure (34), enclosing the elongatable internally-located conductive structure (34) within a tight layer of impervious material which softens at a higher temperature than that at which the deformable rod (24) softens for retaining material of the rod (24) within the layer of impervious material;
d. after braiding the strength-member jacket layer (52) around the elongatable internally-located conductive structure (34), heating the towing warp (20) to a temperature at which material of the deformable rod (24) softens;
e. stretching of the strength-member jacket layer (52) sufficiently to elongate the towing warp (20) and to thereby:
  i. deform the rod (24) responsive to a reduction in cross-sectional area of the strength-member jacket layer (52); and
  ii permanently lengthen the strength-member jacket layer (52); and
f. while maintaining tension on the strength-member jacket layer (52), cooling the towing warp (20) until the material of the deformable rod (24) solidifies.

14. The method of claim 1 wherein the step of providing the elongatable conductor (22, 122) further comprises the steps of assembling an elongatable internally-located conductive structure (134) by enclosing an unstretched elongatable braided conductor (122) that is capable of electrical energy and/or current transmission within a non-conductive braided sheath (124).

15. The method of claim 14 wherein the step of providing the elongatable internally-located conductive structure (134) further comprises the step of enclosing the braided conductor (122) enclosed within the braided sheath (124) within an extruded layer (132) of polymeric material.

16. The method of claim 15 wherein the step of enclosing the braided conductor (122) enclosed within the braided sheath (124) within an extruded layer (132) of polymeric material further comprises a step of forming the extruded layer (132) from cellular polyethylene.

17. The method of claim 1 comprising a further step of braiding a shielding layer (36) of electrically conductive material around the elongatable conductor (22, 122), the braided shielding layer (36) being capable of elongating while remaining unimpaired.

18. The method of claim 17 further comprising a step of enclosing the elongatable conductor (22, 122) and the shielding layer (36) within a barrier layer (42) of insulating material.

19. The method of claim 18 wherein the step of providing the barrier layer (42) of insulating material enclosing the elongatable conductor (22, 122) and the shielding layer (36) comprises a further step of including cellular polyethylene in the barrier layer (42).

20. A towing warp (20, 120) capable of transmitting at least data signals, the towing warp having a strength member and having a conductor, the towing warp having a high breaking-strength and lighter weight in water than a conventional towing warp having a strength member formed exclusively of steel wire, the towing warp produced by a method, the method for producing the towing warp (20, 120) comprising steps of:
a. providing a conductor (22, 122) that is formed so as to be capable of undergoing permanent elongation and that also is adapted for at least electrical energy and/or current transmission;
b. forming a strength-member jacket layer (52) of polymeric material around at least a portion of the conductor (22, 122) while simultaneously ensuring that the at least a portion of the conductor (22, 122) remains elongatable when enclosed within the strength-member jacket layer (52); and
c. stretching the strength-member jacket layer (52) so as to permanently elongate both the strength member jacket layer (52) and the at least a portion, of the conductor (22, 122) while simultaneously not breaking the at least a portion of the conductor.

21. The towing warp (20, 120) produced by the method of claim 20 wherein the method further comprises coupling the conductor (22, 122) with a deformable rod (24) and selecting for the deformable rod (24) a material that is a thermoplastic material.

22. The towing warp (20, 120) produced by the method of claim 20 wherein the method further comprises an additional step of enclosing the at least a portion of the conductor within at least a layer of a deformable material, the layer of deformable material situated between the conductor and at least portions of the strength member.

23. The towing warp (20, 12) produced by the method of claim 22 further comprising further steps of:
c. before braiding the strength-member jacket layer (52) around the at least a portion of the conductor (22, 122), enclosing the conductor (22, 122) within a tight layer of impervious material which softens at a higher temperature than that at which the deformable material situated between the conductor and at least portions of the strength member softens, for retaining material of the deformable material within the layer of impervious material;
d. after braiding the strength-member jacket layer (52) around the conductor (20, 120), heating the towing warp (20) to a temperature at which material of the deformable material softens; e. stretching of the strength-member jacket layer (52) sufficiently to elongate the towing warp (20) and to thereby: i. deform the deformable material responsive to a reduction in cross-sectional area of the strength-member jacket layer (52); and ii permanently lengthen the strength-member jacket layer (52); and f. while maintaining tension on the strength-member jacket layer (52), cooling the towing warp (20) until the material of the deformable material solidifies.

24. The towing warp produced by the method of claim 23 wherein the step of providing the elongatable conductor (22, 122) further comprises the steps of assembling an elongatable internally-located conductive structure (134) by enclosing an unstretched elongatable braided conductor (122) that is capable of electrical energy and/or current transmission within a non-conductive sheath (124).

25. The towing warp produced by the method of claim 24 wherein the step of providing the elongatable internally-located conductive structure (134) further comprises the step of enclosing the braided conductor (122) enclosed within the sheath (124) within an extruded layer (132) of polymeric material.

26. A towing warp (20, 120) capable of transmitting at least electrical energy and/or data signals, the towing warp (20, 120) having a strength member jacket layer (52) and having at least one conductor (22, 122), the towing warp (20, 120) having a lighter weight in water than a conventional towing warp having a strength member formed exclusively of steel wire, the conductor (22, 122) being adapted for at least electrical energy and/or current transmission, and the strength-member jacket layer (52) being formed of polymeric material around at least a portion of the conductor (22, 122), the towing warp (20, 120) being characterized by the fact that the conductor (22, 122) is formed with a braided construction.

27. The towing warp (20, 120) of claim 26 further characterized by the fact that the towing warp also includes a deformable thermoplastic material.

\* \* \* \* \*